Sept. 4, 1962  R. E. GUSTAFSON  3,052,123
TEMPERATURE SENSING ELEMENT AND METHOD OF INSTALLATION
Filed May 21, 1959  2 Sheets-Sheet 1

INVENTOR
ROBERT E. GUSTAFSON

BY
*R. A. Mills*
*B. L. Zangwill*
ATTORNEYS

Sept. 4, 1962 R. E. GUSTAFSON 3,052,123
TEMPERATURE SENSING ELEMENT AND METHOD OF INSTALLATION
Filed May 21, 1959 2 Sheets-Sheet 2

INVENTOR
ROBERT E. GUSTAFSON
BY
ATTORNEYS

United States Patent Office 3,052,123
Patented Sept. 4, 1962

3,052,123
TEMPERATURE SENSING ELEMENT AND METHOD OF INSTALLATION
Robert E. Gustafson, Severna Park, Md., assignor to the United States of America as represented by the Secretary of the Navy
Filed May 21, 1959, Ser. No. 814,936
4 Claims. (Cl. 73—343)
(Granted under Title 35, U.S. Code (1952), sec. 266)

The invention described herein may be manufactured and used by or for the Government of the United States of America for governmental purposes without the payment of any royalties thereon or therefor.

This invention relates to bearings and more particularly to the location of temperature sensing elements in journal and thrust bearings.

In certain machinery applications it is desirable to measure the operating temperature of journal or thrust bearings in order to detect excessive bearing temperatures, which temperatures should indicate some form of trouble. This disclosure describes methods and structures for installing temperature sensing elements in babbitt-lined journal bearings and in thrust bearings.

When measuring bearing temperatures to detect excessive temperature rises the sensitivity of the system is affected by the thermal path between the point of maximum temperature and the sensing element. This maximum temperature usually occurs near the line of minimum oil film thickness in a bearing which in turn is at the maximum load line of the bearing. Therefore, maximum sensitivity requires installing the sensing element as close as possible to the oil film and/or providing a good thermal path from the heat source to the element. Where requirements of the bearing preclude having a sensing element exposed to the lubricant film it is necessary to install the element within the bearing material.

Several ways of improving the heat transfer between the lubricant film and a temperature sensing element at some distance from the film are to have the heat flow through materials with good heat transfer characteristics; have the various materials in the path of heat flow intimately bonded together; and to have the thermal path as short as possible.

The method of installing temperature sensing elements in babbitt lined bearings herein disclosed incorporates these principles and has the further advantages of providing an uninterrupted bearing surface, good mechanical strength, and requiring only a simple drilled hole for installation.

A broad object of the present invention is to provide a simple and inexpensive method of installing temperature sensing elements in journal and thrust bearings.

Another object of the invention is to provide a method of installing temperature sensing elements in bearings without interrupting or interfering with the bearing surface.

A further object of this invention is to provide a method of installing temperature sensing elements in bearings without interfering with normal lubrication of such bearings and without causing leakage of lubricant.

A further object of this invention is to provide a bearing-temperature sensing assembly having good heat transfer characteristics between the bearing surface and the temperature sensing element.

The invention, together with the above and other objects and advantages, is set forth in more technical detail in the following description and accompanying drawings in which like reference characters designate like parts throughout the several views and wherein.

Figure 1:
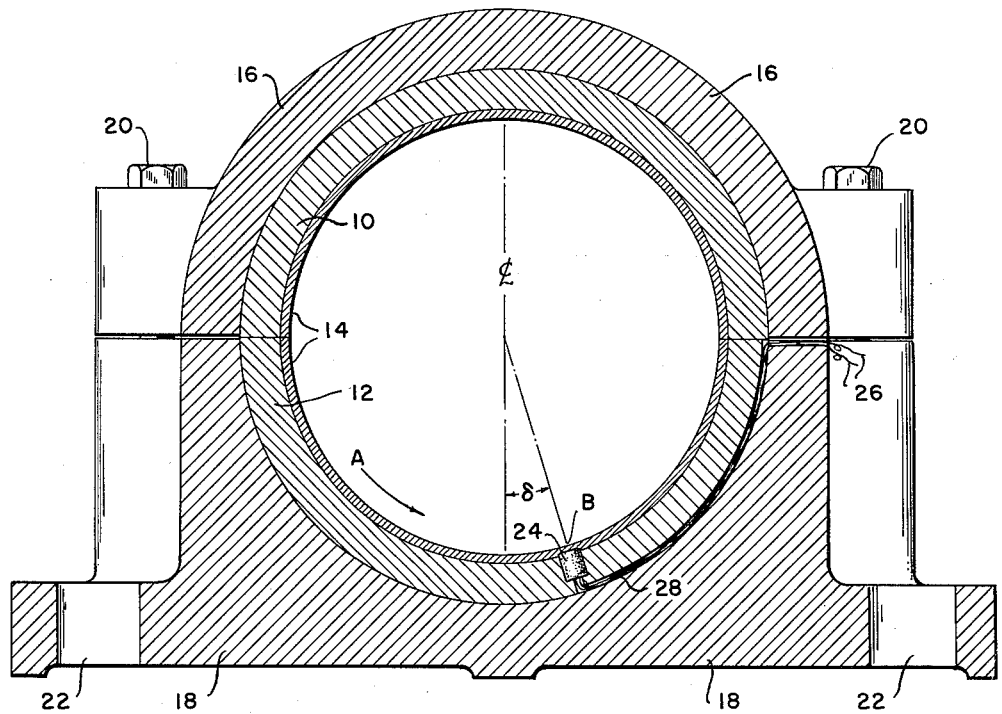
FIG. 1 is a transverse vertical section through a conventional bearing showing the location of a temperature sensing element in accordance with a preferred embodiment of the instant invention.

Referring to the drawings, first to FIG. 1, the invention is shown incorporated in a conventional journal bearing comprising a pair of semi-cylindrical shells 10 and 12 formed of brass or like material and each having a lining or bearing surface 14 formed of babbitt or similar bearing material. The shells are keyed to and supported by upper and lower bearing supports 16 and 18, which supports are held together by machine screws 20. The lower support or saddle is provided with openings 22 for attachment to a foundation, not shown. For clarity of illustration, the shaft has been omitted, however, the direction of rotation of the shaft is indicated by the arrow A.

In a bearing of the type illustrated in FIG. 1, the maximum load line of the bearing, and consequently the line of minimum oil film and maximum temperature, is located off center in the direction of rotation of the shaft relative to a vertical plane through the longitudinal axis of the shaft and is indicated at B. The angle $\delta$, FIG. 1, which the load line makes with the longitudinal vertical plane of the bearing may vary, for example, with the direction of rotation of the shaft, the speed of rotation and the load on the shaft.

In accordance with the instant invention and as shown in FIG. 1, a temperature sensing element 24, to be referred to in detail hereinafter, is located in the lower bearing shell in the plane of the maximum load line just beneath the babbitt lining. The temperature sensing element is a tip-sensitive resistance type temperature detector having lead wires 26 leading therefrom, which wires are located in a groove 28 (FIG. 2) in the periphery of the lower shell and are connected to a suitable monitoring device, not shown.

Figure 2:
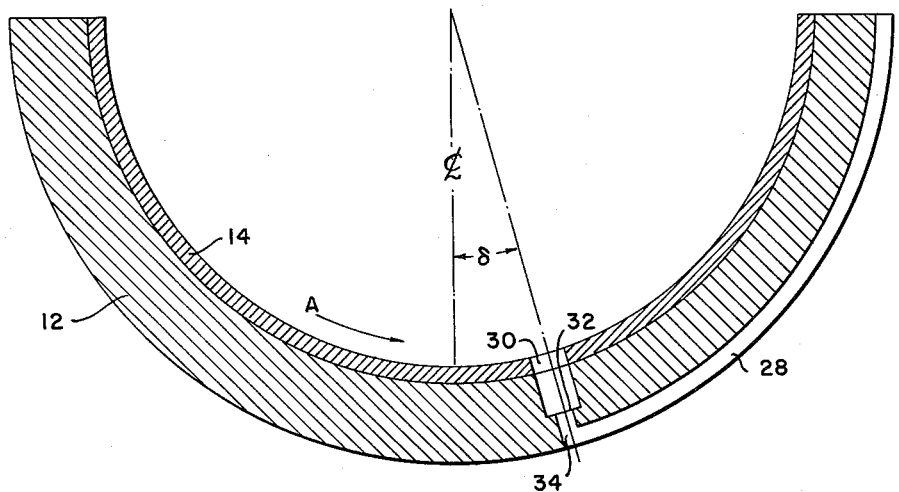
FIGS. 2, 3 and 4 are partial transverse sections similar to FIG. 1 and showing various steps in the assembling of a temperature sensing element in a journal bearing in accordance with this invention.
Figure 3:
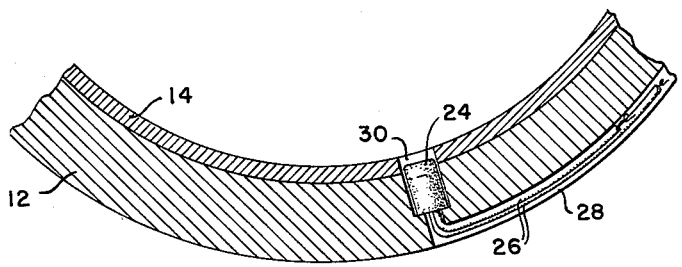
Figure 4:
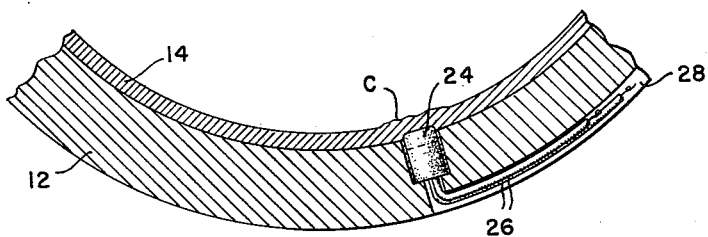

FIGS. 2, 3 and 4 illustrate a method of installing the temperature sensing element in a journal bearing in accordance with this invention.

Briefly, the method consists of fusion bonding the temperature sensing element to the metal comprising the shell 12 of the bearing and also to the babbitt or similar material which forms the lining 14 of the bearing. This method can be illustrated by the step-by-step installation of a tip-sensitive resistance element in a babbitt lined bearing.

The element in this illustration, FIG. 1, is a Thomas A. Edison Industries tip-sensitive resistance temperature detector, with a length of ⅜″ and a diameter of ¼″, produced specifically for the instant method of installation. This element 24 has a thin brass outer casing, that is given a light tin coating.

FIG. 2 shows a section of a typical bearing with a hole 30 drilled and reamed to receive the ¼" x ⅜" sensing element. This hole has been given a square shoulder, 32, ⁷⁄₁₆" from the surface of the babbitt 14, with a smaller hole 34 for the lead wires 26 going through to the back of the bearing. The purpose of the shoulder is to accurately position the sensing element with its tip ¹⁄₁₆" below the babbitt surface, and to lend support to it if necessary.

FIG. 3 shows the sensing element in position in the bearing shell, ready for bonding to the babbitt. At this point the bearing shell may be heated to about 300 degrees Fahrenheit to facilitate the flowing operation.

Babbitt is added to the hole in the bearing lining over the sensing element tip and caused to bond with the tip and sides of the element and with the surrounding babbitt by using a local source of heat, such as a soldering iron, to melt the babbitt and to heat the surrounding metals hot enough to obtain good bonding. A flux, such as zinc chloride, is used in this operation. It is important to use enough heat to flow the babbitt metal down around the tip of the sensing element for a distance of at least ⅛" to obtain good mechanical strength and good heat transfer. The bearing lining then has a small area C (FIG. 4) where the babbitt has been "puddled," which area does not conform to the contour of the original smooth bore or bearing surface.

The "puddled" area is now scraped smooth to blend with the bore of the bearing lining. The lead wires 26 are fixed in position in the groove 28 by potting them in which a suitable protective material such as an epon resin or a plastic, not shown.

In general this method is applicable to the installation of any heat sensing devices which can be bonded to the bearing lining metal. This includes bare-wire or encased thermocouples, encased thermistors, resistance thermometers, and other devices with suitable metal surfaces. As described, the sensing element is installed in a close fitting hole in the bearing shell, and then a soldering iron or other heat source is used to puddle in bearing lining metal to bond the element into place and to fill in the hole in the face of the bearing, after which the cooled surface is scraped smooth to correspond to the original bearing bore.

In installations where a single temperature sensing element is used, such element is located on the load line B (FIG. 1) approximately midway the length of the bearing. For relatively long bearings, a plurality of sensing elements may be used in which case the elements are appropriately spaced along the load line. By using two temperature sensing elements on the load line, one near each end of the bearing, misalignment of the shaft may be detected. That is, even temperature reading from two such sensing elements indicates proper alignment; whereas, uneven temperature readings indicate misalignment.

In thrust bearing installations, the method of installing the temperature sensing element or elements is substantially the same as that described for journal bearing installation.

In applications where it is not practical to install the temperature sensing element in the manner shown and described with reference to FIGS. 1-4, where space limitations or other considerations prevent the machining of a shoulder to support the temperature sensing element, the arrangement shown in FIG. 5 may be used.

Figure 5:
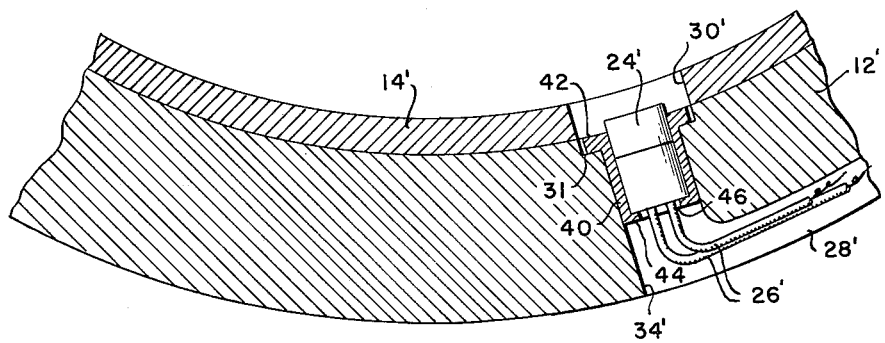
FIG. 5 is a partial transverse section through a journal bearing, illustrating a second embodiment of the instant invention.

Referring now to FIG. 5, in accordance with this embodiment of the invention, the babbitt lining 14' and shell 12' are provided with a first bore 30' of given diameter and the shell is provided with a second bore 34' of smaller diameter, thereby providing a shoulder 31 between such bores. A cylindrical sleeve 40, made of steel, brass or like metal, is inserted into the bore 34' and has a peripheral flange 42 that rests on the shoulder 31 and limits outward movement of the sleeve relative to the bearing. The sleeve is formed with an inwardly projecting flange 44 and an opening 46 in the bottom thereof, which flange and opening perform the same function as the shoulder 32 and opening 34, respectively, of the FIG. 2 embodiment. Referring still to FIG. 5, a temperature sensing element 24' is fitted within the sleeve 40 with the lower end of such element resting on the flange 44, with the upper end of the element projecting above the peripheral flange 42, and with the lead wires 26' passing through the opening 46 in the bottom of the sleeve.

Three principles must be followed in designing and installing the sleeve 40: The sleeve must be capable of supporting the temperature sensing element under the maximum oil film pressure to be encountered; the material of the sleeve should have a coefficient of thermal expansion similar to that of the temperature sensing element; and during the fusion bonding process, the babbitt must bond to the sleeve as well as to the element, therefore, the sleeve must be tinned at the upper flanged end. After insertion of the sleeve within the bearing and the temperature sensing element within the sleeve, as shown in FIG. 5, the fusion bonding, puddling and finishing steps are substantially the same for the FIG. 5 embodiment as described hereinbefore for the FIGS. 1-4 embodiment and need not be repeated here.

It should be understood, of course, that the foregoing disclosure relates to only preferred embodiments of the invention and that numerous modifications or alterations may be made therein without departing from the spirit and the scope of the invention as set forth in the appended claims.

What is claimed is:

1. The combination with a bearing having a backing member and a bearing lining, adapted to support a rotatable shaft, of a system for indicating the temperature of the bearing comprising a temperature sensing element located wholly within said bearing, means mounting said sensing element within the backing member with a sensing tip of such element located in said lining immediately adjacent the bearing surface of the lining in a plane of maximum load on the surface of the bearing lining and transmission means for transmitting temperature indications from said sensing element to a monitoring device remote to said bearing; said transmission means including a groove extending along a portion of the periphery of said backing member and a signal carrying element disposed in said groove and interconnecting said sensing element and said monitoring device.

2. The combination as set forth in claim 1 wherein the means mounting the temperature sensing element within the backing member includes a sleeve located within a bore in the backing member for locating the sensing element and having a first flange on an inner end thereof for limiting movement of such sleeve outwardly of the backing member and a second flange thereon for limiting outward movement of the sensing element relative to the sleeve.

3. The combination as set forth in claim 2 wherein the sleeve is fusion bonded to the backing member and to the bearing surface, and wherein the temperature sensing element is fusion bonded to the sleeve and to the bearing surface.

4. The method of installing a temperature sensing element in a bearing having a backing member and a bearing lining for supporting a rotatable shaft which comprises locating on the bearing surface of the lining the line of maximum load-minimum lubricant film between the shaft and bearing surface, boring a hole through the bearing lining and into the backing member on the line of maximum load-minimum lubricant film, locating a temperature sensing element within the hole with the sensing-tip of the element beneath the bearing surface of the lining and with a void remaining between the sensing-tip and lining surface, puddling a bearing metal into the void thereby filling the void and fusion bonding the sensing element to the lining, and removing excess puddled metal from the bearing surface so as to restore the original contour of the bearing surface of the lining.

References Cited in the file of this patent

UNITED STATES PATENTS

| | | |
|---|---|---|
| 1,239,450 | Banneyer | Sept. 11, 1917 |
| 1,394,484 | Fitts | Oct. 18, 1921 |
| 1,775,682 | Martin | Sept. 16, 1930 |
| 1,838,728 | Anderson | Dec. 29, 1931 |
| 2,343,242 | Richmond | Mar. 7, 1944 |

FOREIGN PATENTS

| | | |
|---|---|---|
| 421,929 | France | Jan. 5, 1911 |
| 639,732 | Great Britain | July 5, 1950 |

OTHER REFERENCES

Patton et al.: "A Method of Installing Tube-Wall Thermocouples," U.S. Department of Agriculture Analytical Edition, vol. 13, No. 11, Nov. 15, 1941.

"Journal Bearing Lubrication" (Roach and Griffin) in Product Engineering, October 1949 (p. 99 relied on, copy in Scientific Library and in Div. 36).